Dec. 18, 1934.  H. K. MOFFITT  1,984,978

VEHICLE BODY EQUALIZING MECHANISM

Filed Dec. 22, 1932  2 Sheets-Sheet 1

Inventor
Henry K. Moffitt,

By

Attorney

Dec. 18, 1934.    H. K. MOFFITT    1,984,978
VEHICLE BODY EQUALIZING MECHANISM
Filed Dec. 22, 1932    2 Sheets-Sheet 2
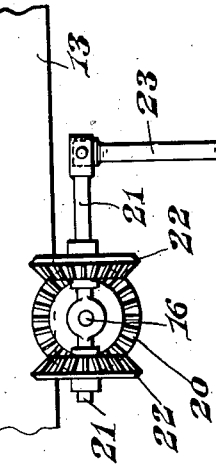
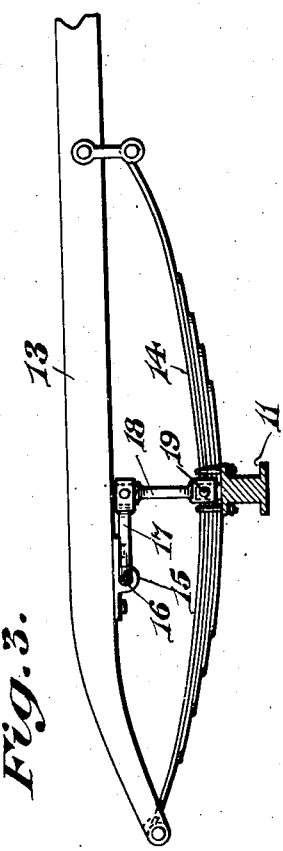
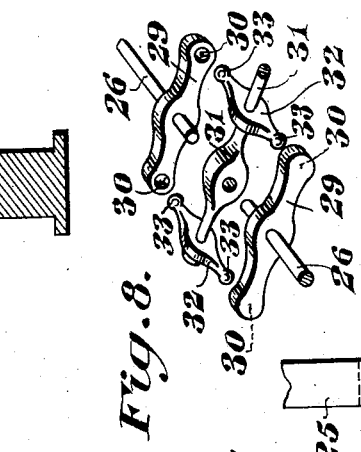
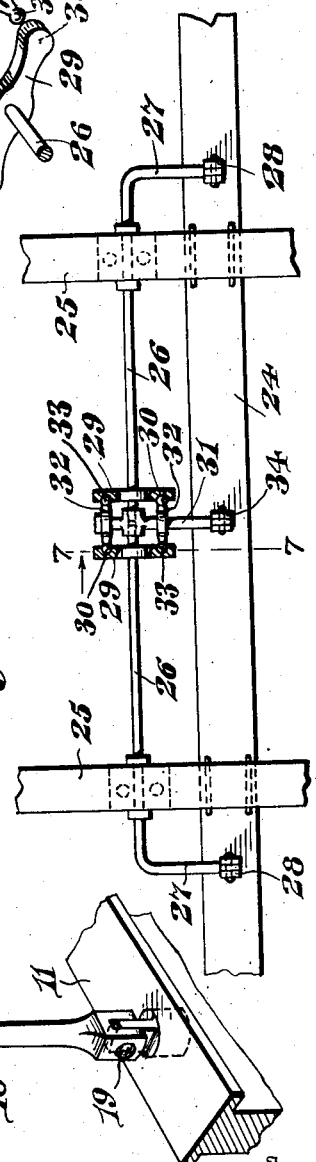
Inventor
Henry K. Moffitt,
By
Attorney Patented Dec. 18, 1934

1,984,978

UNITED STATES PATENT OFFICE 1,984,978

VEHICLE BODY EQUALIZING MECHANISM

Henry K. Moffitt, Harrisburg, Pa.

Application December 22, 1932, Serial No. 648,490

14 Claims. (Cl. 280—112)

The present invention relates to mechanism for equalizing the forces between the axle and the side portions of a vehicle body thereby preventing the twisting of the body structure due to the lifting force created by the different wheels of such vehicles through their uneven elevation as by one wheel or the other passing over an irregularity in the road on which the vehicle is travelling, and also acting to firmly maintain both wheels on the roadway when making a turn and notwithstanding the tendency of the body to tilt laterally during the turning movement.

It has heretofore been proposed to maintain a vehicle body in a position substantially parallel to its axles under superimposed loads unevenly distributed on the body of the vehicle. This invention, however, in one of its aspects has a different object namely as the axle tilts to provide for the transmission of a portion of a force created between the axle and body by their change in angular relation on one side of the vehicle body to the opposite side so as to maintain the body in a substantially level position and without any attempt to maintain parallelism between the axle and vehicle body. In fact it is the movement of the axle out of parallelism that has heretofore tended to correspondingly move the body and has created the undesirable strains and torsion. In other words in the usual structure whenever one wheel is raised, the body supporting springs adjacent thereto are compressed and the overlying corner is elevated, causing the body to have a tendency to turn or twist into a parallel relation with the elevated axle. The inertia of the opposite side, however, causes it to resist the movement and to remain in substantially its original position, thereby accentuating the twisting or torsional strain on the frame. And again in making a turn, the body tends to laterally tilt, thus having a tendency to press down the wheels on one side and lighten the load on the wheels of the opposite side. The present invention provides means whereby on the tilting movement of the body there is transmitted to the wheels at the elevated side additional downward pressure, thereby overcoming the tendency of the wheels to skid.

The present invention therefore aims to, at least in great measure, overcome difficulties common to the usual vehicle, and not only thus greatly prolonging the life of the structure, but making for more comfortable riding, and further adding to safety, particularly in making turns at relatively high speeds.

In the accompanying drawings:

Figure 3 is a side elevation with the axle in section and taken on the line 3—3 of Figure 2.

Figure 4 is a detail sectional view on the line 4—4 of Figure 2.

Figure 5 is a detail perspective view of the crank connection between one of the rock shafts and the axle.

Figure 6 is a plan view of a slightly modified form of construction.

Figure 7 is a sectional view substantially on the line 7—7 of Figure 6.

Figure 8 is a detail perspective view of the differential mechanism of Figure 6, with the parts separated.

While in the structure illustrated the mechanism is shown on the front axle of a vehicle, it will be understood that it may be applied to either or both. Considering first the embodiment disclosed in Figures 1–5 inclusive, the axle is shown at 11, and may be of the standard or any desired form. It is supported at its ends on the usual wheels 12. Overlying said axle is the usual body member or structure, the side frame bars or chassis being illustrated at 13, and preferably supported on the axle by springs 14. It will be understood that it is intended to show standard construction, and that any form of such construction may be employed as desired.

Figure 2:
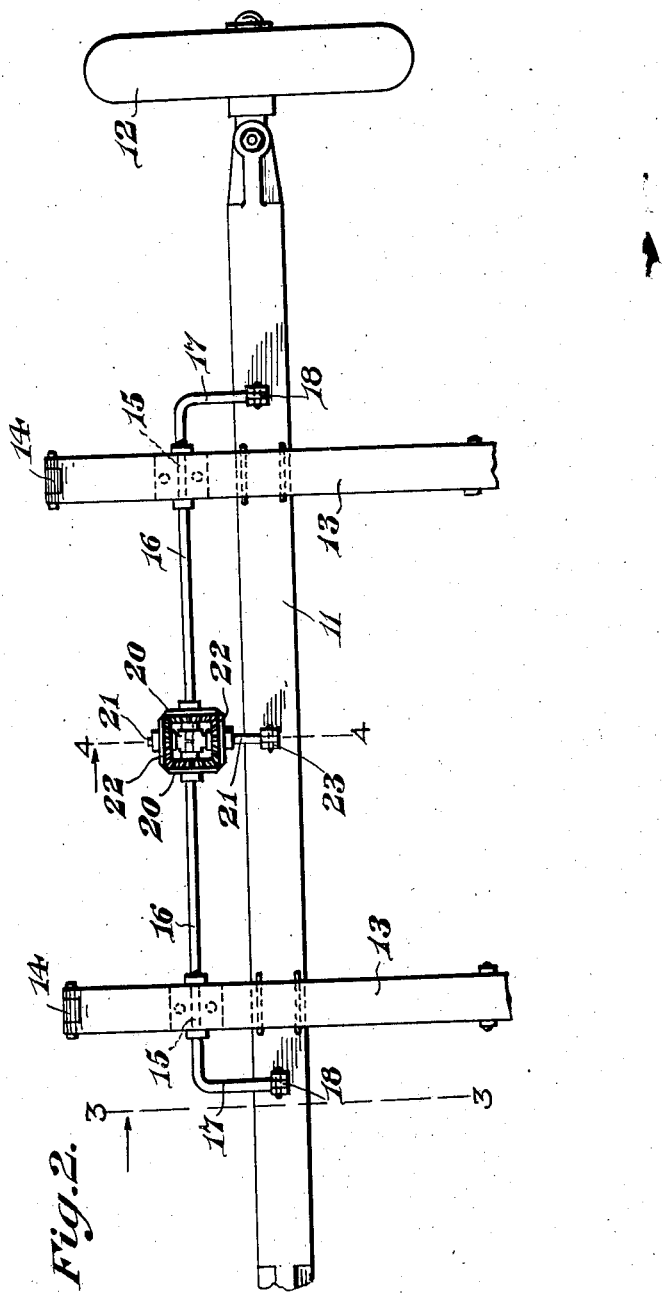
Figure 2 is a plan view of the same.

Journaled on each of the side frame bars 13, at 15, is a transversely disposed rock shaft 16 paralleling the axle 11. Each shaft has at its outer end a crank arm 17 pivotally connected to a link 18 that in turn is pivotally connected at 19 to the adjacent end portion of the axle 11. The inner ends of these rock shafts 16 are connected by a differential gear mechanism. In the present embodiment this consists of a pair of beveled gears 20 fixed to the inner end portions of the shafts 16 in opposing relation, the shafts preferably projecting inwardly beyond the gears as indicated in Figure 2. On these projecting ends is journaled a carrier stub shaft 21 arranged transversely of the shafts 16 and having journaled thereon idler gears 22 arranged in opposing relation and meshing with the gears 20. The shaft 21 can turn on the shaft 16 as an axis, and at one end the stub shaft 21 is pivoted to a link 23 that is in turn connected to the central portion of the axle 11.

With this structure it will be evident that as long as the wheels 12 operate on a level surface and on a common plane, the structure above described is substantially inactive. If both wheels together rise the same distance the two shafts turn in the same direction and as the central portion of the axle will correspondingly rise, no strain is brought upon the axles, as the mounting of the idler gears, to-wit, the shaft 21, will turn on the shafts 16 and the idler gears will be correspondingly moved. The two sets of springs 14 therefore can simultaneously compress and expand without interference and without effecting any destructive influences on the mechanism.

Figure 1:
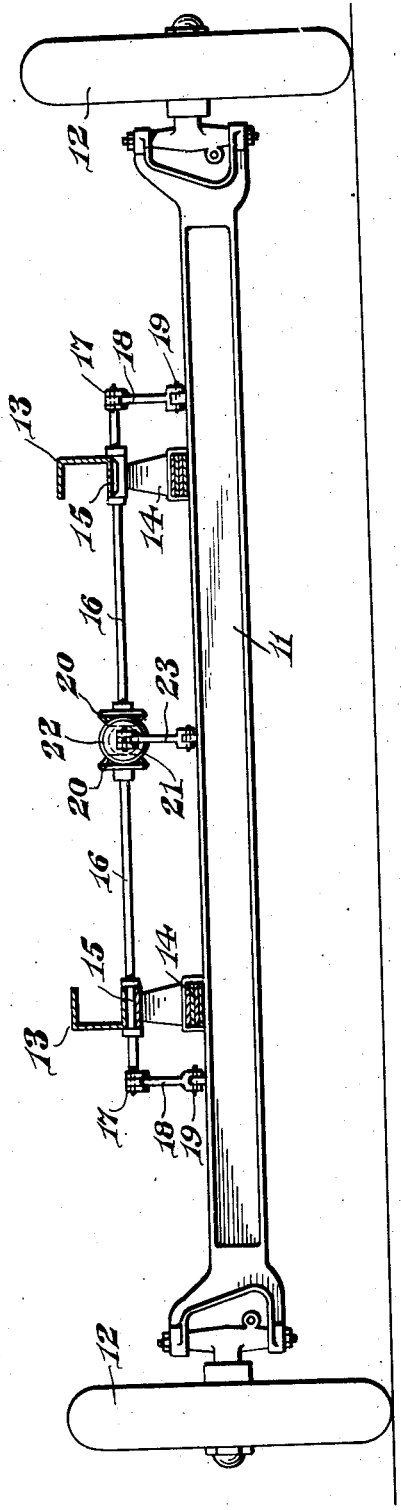
Figure 1 is a front elevation of the front axle and wheels of an automobile with the overlying chassis or frame and showing one embodiment of the invention in place thereon.

If, however, one wheel, for example the right wheel of Figure 1, should pass over an elevation that would lift it and the corresponding end of the axle while the other or left wheel 12 remains in its original plane, a compression of the right hand spring 14 will take place followed by a predetermined elevation of the right hand frame bar 13. As the right hand end of the axle rises, the link 18 connected thereto will be elevated, thereby acting on the crank arm 17 and turning the right hand rock shaft 16 in a clockwise direction. This will turn the gear 20 fixed thereto in a corresponding direction and turn the idler gears in opposite directions, thereby rotating the left hand rock shaft in an opposite direction. The consequence is that as the left hand wheel is on a fixed base or support the left hand link 18 cannot be depressed and a downward pressure of the left hand crank arm 17 causes the left hand end of the rock shaft 16 to rise, thereby elevating the left hand frame bar 13, consequently causing both sides of the frame or body member to be correspondingly elevated and maintaining a level relation notwithstanding the inclination of the axle. Moreover as this inclination will of course cause the center of the axle to assume an elevated position, the link 23 will be elevated a corresponding amount and the carrier shaft 21 turned on the shafts 16 to take care of the differently related parts, without however, creating any undesirable strain on the elements due to the alteration of their relation. In other words all the parts will accommodate themselves to their changed conditions and at the same time the desirable maintenance of the body in its initial position is obtained. Not only are these results secured as one wheel rises and falls with respect to the other, but in making turns the force due to the lateral tilting of the body which causes its depression at one side is equalized and transmitted to the opposite side where its action is to cause a downward pressure upon the wheels at said side, insuring their firmer grip on the roadway and thus adding to their anti-skidding tendency.

In the embodiment shown in Figures 6, 7 and 8 the structure is substantially the same as that above described save for the specific construction of the compensating or differential mechanism. Therein the axle is designated 24, and the side frame bars of the body member are 25. The two rock shafts are shown at 26 and have outer crank arms 27 linked at 28 to the axle 24. Instead of gears, heads 29 are fixed to the inner adjacent ends of the shafts 26 and have in the ends of their opposing faces sockets 30. A carrier shaft 31, journaled on the inner projecting ends of the shafts 26, has pivotally mounted thereon idler heads 32 terminating in balls 33 that engage in the sockets 30 so that when one or the other of the heads 29 is turned in one direction, obviously the other head 29 will be turned in an opposite direction. The shaft 31 has a link connection 34 with the central portion of the axle 24. It will be clear that this structure operates exactly as that of Figures 1 to 5 inclusive.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In combination with a relatively movable vehicle body member and support therefor, of mechanism for transmitting an elevating force to one side of the body member when the other side is elevated, including means for making the mechanism ineffective when the support is moved equally with respect to both sides of the body member.

2. In combination with a vehicle body member, and supporting means therefor located at the opposite sides of said body member and separately movable upwardly toward the body member, of mechanism for causing the elevation of one side of the vehicle body member when the supporting means at the opposite side is elevated, including means for making the mechanism ineffective when the support is moved equally with respect to both sides of the body member.

3. In combination with a vehicle body member, and supporting means therefor located at the opposite sides of said body member and separately movable upwardly toward the body member, of mechanism for causing the elevation of both sides of the body member a substantially equal amount on the elevation of the supporting means at either side with respect to the supporting means at the opposite side, including means for keeping the mechanism inactive when the supporting means at both sides of the body member is simultaneously moved.

4. In combination with a vehicle axle and a body member supported thereon, said axle having its end portions relatively movable toward the body member, of inelastic means connecting the adjacent portions of the axle and sides of the body member, and connections between said means to cause the elevation of one end portion of the axle to elevate the adjacent side of the body member and also elevate the opposite side a substantially corresponding amount, including mechanism connecting the axle and the connections between the inelastic means to cause the latter to be ineffective when both ends of the axle are simultaneously and correspondingly elevated or depressed.

5. In combination with a vehicle axle and a body member supported thereon, said axle having its end portions relatively movable toward the body member, of a set of devices connecting each end portion of the axle and adjacent side portions of the body member that permits each axle end to rise with respect to the other end toward the adjacent side portion of the body member, means connecting said devices to cause one to operate oppositely to the other and upon the elevation of either end of the axle to raise the adjacent side portion of the body element and also the remote side substantially the same amount, including a mounting for said connecting means connected to the axle and moving therewith to cause the connecting means to be ineffective when both ends of the axle are simultaneously and correspondingly elevated or depressed with respect to the body member.

6. In combination with a vehicle axle and a body member supported thereon, said axle having its end portions relatively movable toward the body member, of a set of devices connecting each end portion of the axle and adjacent side portion of the body member that permits each axle end to rise with respect to the other end toward the adjacent side portion of the body member, means connecting said devices and including an interposed differential mechanism to cause one to operate oppositely to the other and upon the elevation of either end of the axle to raise the adjacent side portion of the body element and also the remote side substantially the same amount, including a mounting for said differential mechanism connected to the axle between its ends and acting to make the differential inoperative when the axle rises or falls equally throughout its length and with respect to the body member.

7. In combination with a vehicle body member, of an axle member therefor, rock shafts journaled on one of the members, a differential mechanism connecting the rock shafts to cause their reverse rotations, crank connections between the rock shafts and the other member, and a mounting for the differential mechanism connected to and movable with the axle.

8. In combination with a vehicle body member, of an axle member therefor, rock shafts journaled on the body member, crank connections between the outer ends of the respective rock shafts and the end portions of the axle, a differential mechanism connecting the inner ends of the rock shafts, and a mounting for the differential mechanism connected to and movable with the axle.

9. In combination with a vehicle body member, of an axle member therefor, rock shafts journaled on the body member, crank connections between the outer ends of the respective rock shafts and the end portions of the axle, and a differential mechanism connecting the inner ends of the rock shafts and including idlers, and a mounting for said idlers movably supported on the axle.

10. In combination with a vehicle body member, of an axle member therefor, rock shafts journaled on the body member, crank connections between the outer ends of the respective rock shafts and the end portions of the axle, and a differential mechanism connecting the inner ends of the rock shafts and comprising transmission members on the inner ends of the rock shafts, a transverse shaft pivotally mounted between the members, idlers journaled on the transverse shaft and engaged with the transmission members, and a movable connection between the transverse shaft and the axle.

11. In a vehicle, the combination with an axle member and a body member supported thereon, said members being capable of assuming different angular relations, of mechanism interposed between the axle and body members for transmitting the force created by the approach of one side of the vehicle body member and adjacent portion of the axle to the opposite portions of the axle and body members and creating between them a separating force that produces a downward pressure upon said opposite portion of the axle, including means for making the force ineffective when the portions of the axle member adjacent to the opposite sides of the body member move equally and with respect to said body member.

12. In a vehicle, the combination with a vehicle body member and a transverse axle member for the same, of connecting means between each end portion of the axle member and the adjacent side portion of the body member that permits their relative movement toward and from each other, mechanism between said means that transmits a force created by the relative approach of the axle member and body member at one side to effect a separating action between the axle member and body member at the opposite side, including a connection between the axle and said mechanism that makes the force transmitting means ineffective when both ends of the axle move equally with relation to the body member.

13. The combination with a vehicle body member, of spaced supporting members therefor, said body member and supporting members being relatively movable toward and from each other, mechanism for transmitting the force created by the approach of the body member and one of the supporting members, to the other supporting member and the body member and creating between the latter two a separating force, including means for making said transmitting mechanism ineffective when both supporting members simultaneously and equally move with respect to the body member.

14. The combination with vehicle body member, of spaced supporting members therefor, said body member and supporting members being relatively movable toward and from each other, inelastic mechanisms interposed between the supporting members and each body member for permitting their relative movements toward and from each other, means connecting said mechanisms for transmitting to one of the mechanisms a force tending to separate the body member and supporting member when the body member and the other supporting member move apart, means for making said transmitting mechanism inoperative to transmit such forces when both supporting members move simultaneously and equally toward each other, and springs connecting each supporting member with the body member.

HENRY K. MOFFITT.